Nov. 2, 1937.                F. KAHN                 2,098,099
                        WIND PRESSURE GAUGE
                      Filed July 30, 1932        3 Sheets-Sheet 1
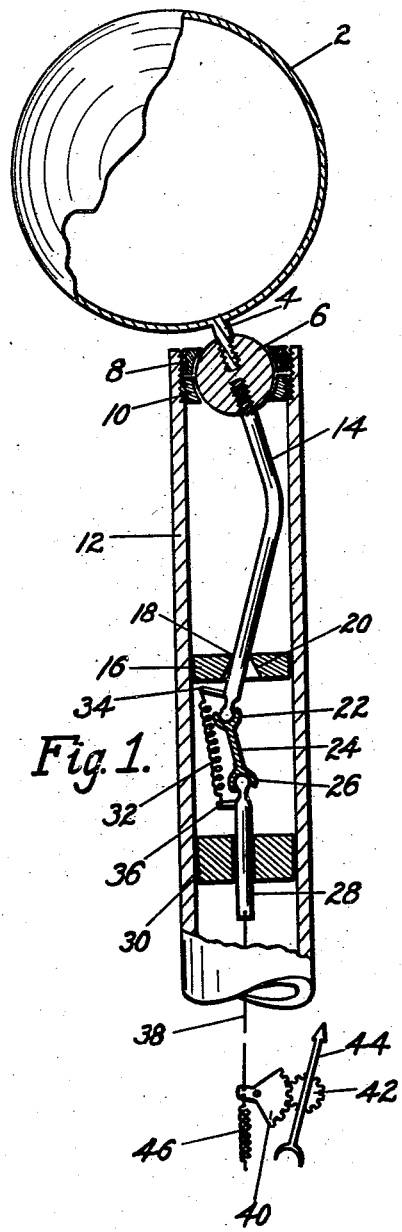
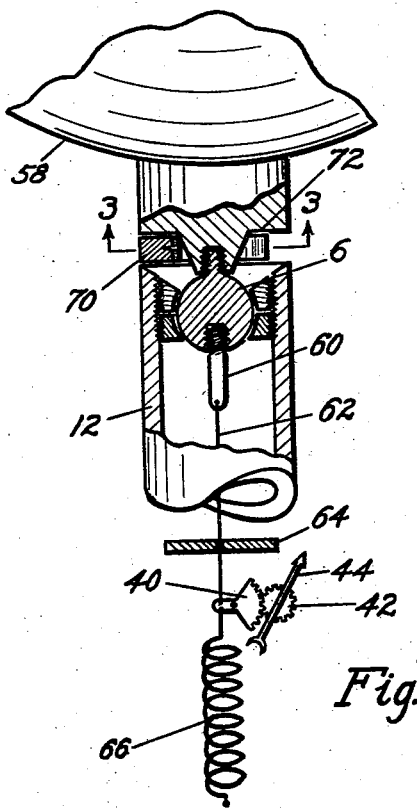
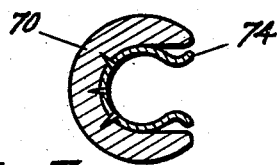
INVENTOR.
Frank Kahn Nov. 2, 1937.  F. KAHN  2,098,099
WIND PRESSURE GAUGE
Filed July 30, 1932  3 Sheets-Sheet 2

INVENTOR.
Frank Kahn

Nov. 2, 1937.   F. KAHN   2,098,099
WIND PRESSURE GAUGE
Filed July 30, 1932   3 Sheets-Sheet 3
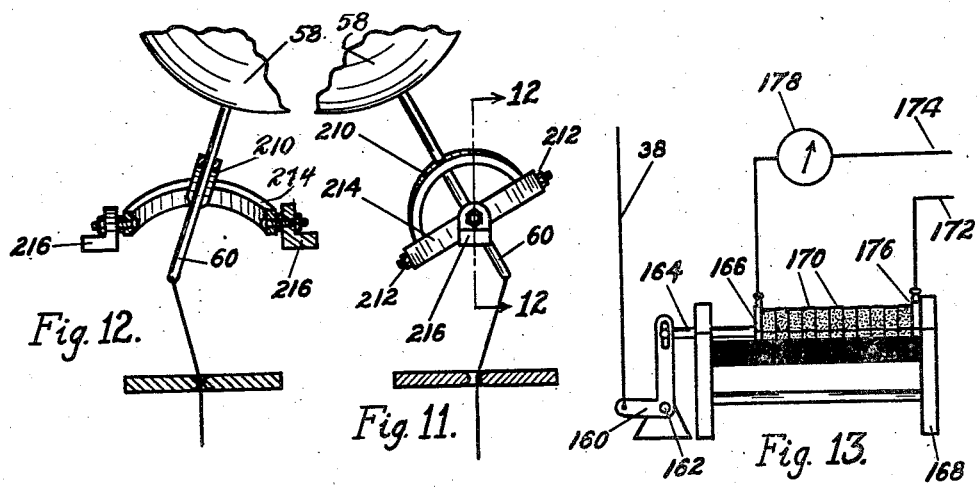
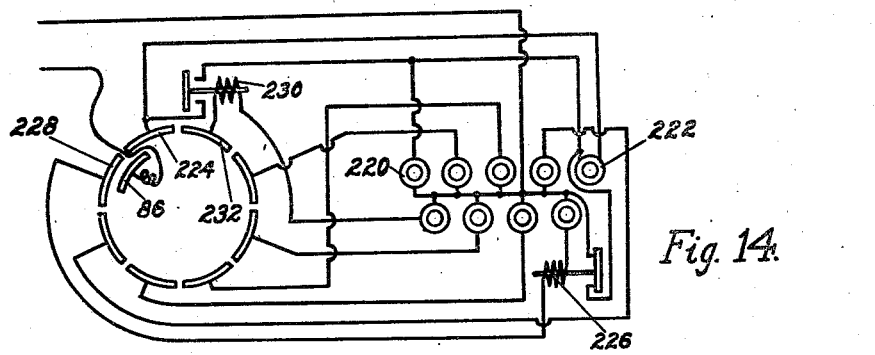
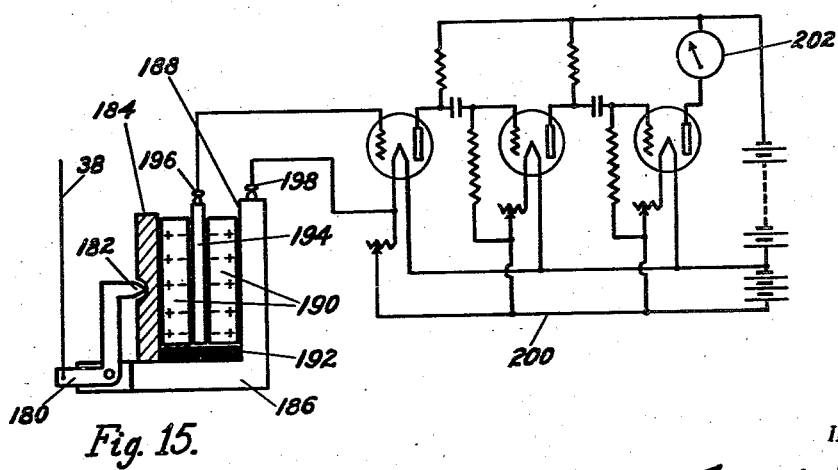
INVENTOR.
Frank Kahn Patented Nov. 2, 1937

2,098,099

UNITED STATES PATENT OFFICE 2,098,099

WIND PRESSURE GAUGE

Frank Kahn, Philadelphia, Pa.

Application July 30, 1932, Serial No. 626,519

9 Claims. (Cl. 177—351)

The present invention is a continuation in part of my application No. 552,130, filed July 21, 1931, now Patent No. 1,996,071 dated April 2, 1935 and relating to umbrellas.

This invention relates to measurement of wind velocity, and relates more particularly to a wind pressure gauge.

Heretofore, instantaneous and accurate registers of wind pressure or velocity have not been possible, due to the fact that time and energy are required to head the present devices into the wind. Due to the necessarily relatively large mass, these devices now available are sluggish, have a high inertia, and lose the instantaneous thrust of the wind unless accidentally left headed into the wind by the last preceding gust of wind.

The primary object of my invention is to provide a wind pressure gauge in which these defects are overcome.

An object of my invention is to provide a wind pressure gauge which measures wind pressures accurately and instantaneously no matter how transient the gust of wind.

Another object of my invention is to provide a wind pressure gauge which is symmetrical with respect to its axis, so that its indication is uniformly accurate no matter what the direction of the wind component perpendicular to the axis.

Another object is to provide a locking device to prevent operation of the device when under repair, while in transportation, or for other reasons.

A further object is to provide a means for simultaneously indicating or recording wind velocities and directions.

A further object is to provide an improved device of the character described, of simple, cheap, and efficient construction, having a maximum efficiency.

With these and other objects in view, which will become apparent as the description proceeds, my invention embodies a wind pressure gauge having a receptive head or surface for intercepting the wind, an enclosed self-aligning universal flexing joint deflected by the head, and indicating and/or recording means to measure the deflection caused by the wind pressure.

The invention, both as to details of construction and combination of parts, will best be understood from the following description of specific embodiments, when read in connection with the accompanying drawings, in which:

Figure 1 is a fragmentary sectional view of my wind pressure gauge in flexed position.

Figure 2 is a fragmentary view of a modification of my wind pressure gauge with a somewhat different type of universal joint and a helical spring to supply the aligning force, and with flexure lock in position.

Figure 3 is a sectional view of the flexure lock taken on the line 3—3 of Fig. 2.

Figure 11 is a fragmentary view of my wind pressure gauge using a Hooke's joint instead of a ball-and-socket joint.

Figure 12 is a fragmentary section taken on the line 12—12 of Fig. 11 with the deflecting head and supporting member not shown in section.

Figure 13 is a side elevational view of an indicating mechanism using a carbon-pile rheostat.

Figure 14 illustrates another wiring connection for the wind-direction-indicator electric circuit of Fig. 6.

Figure 15 is a schematic diagram of an indicating mechanism using a piezo-electric crystal and amplifier.

Figure 4:
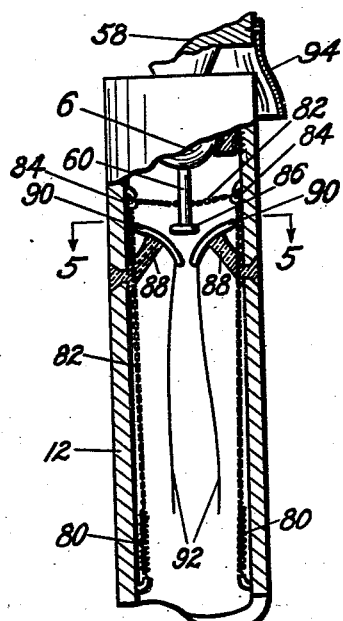
Figure 4 is a fragmentary sectional view of a modification of my wind pressure gauge.

Referring to the drawings, I have shown in Fig. 1 a thin-shelled hollow sphere or head 2, attached by a screw-threaded extension 4 to a metal sphere or ball 6 which forms the ball portion of a ball-and-socket universal joint, the socket portion being formed of elements 8 and 10 having concave surfaces in contact with ball 6 and screw-threaded into a cylindrical supporting tube 12.

A resilient cylindrical flexing member 14 is screw-threaded into the ball 6 and extends downwardly into the tube 12 through a hardened annular fulcrum guide 16 whose upper edge 18 acts as a fulcrum for the flexing member 14. With the joint in vertical or neutral position, hereinafter referred to as the unflexed position, the flexing member 14 is a right-circular cylinder coaxial with tube 12. When the joint is flexed or moved from the vertical or neutral position, the flexing member 14 is bent from the unflexed or straight shape to a curvature corresponding to the force exerted to produce the flexure. Fig. 1 shows the member 14 in flexed position. The surface 20 of the fulcrum guide 16 is conical to provide freedom of sliding motion of the flexing member 14 when flexing.

The lower end of the flexing member 14 is fitted with a ball for the universal ball-and-socket joint 22 connecting to the link 24 which connects at its other and lower end by another ball-and-socket joint 26 to the upper end of a sliding rod 28. A cylindrical guide 30 constrains the movement of the sliding rod 28 to the vertical. A spring 32 is attached to the flexing member 14 and the sliding rod 28 by means of studs 34 and 36 to eliminate lost motion in the linkage. A wire 38 connects the lower end of the sliding rod 28 to a gear sector 40 which engages a gear 42 carrying a deflection indicator 44. A restoring spring 46 returns the indicator 44 to zero position.

The operation of the device is as follows:

The head 2, under the impulse of the wind is deflected from the vertical or neutral position, for example to the position illustrated in Fig. 1. This movement flexes the flexing member 14 and by means of the link 24 raises the rod 28 and thereby actuates the gear and sector mechanism 40, 42 to rotate the indicator 44, whose movement may be read on a scale or moving chart (not shown) calibrated to measure wind pressure or velocity. The resilience of the flexing member 14 aligns the shaft when the wind pressure is relieved. There is no necessity for heading the device into the wind because the self-aligning universal joint holds the head, when unflexed, in constant readiness to receive a fresh impulse.

Instead of the spherical head 2, any strong, light-weight body symmetrical about a vertical axis and having a smooth surface may be used. The spring 32 whose function is mereby to take up backlash may be eliminated, as spring 46 performs the same function. The shape of the body can be readily determined so that a linear deflection characteristic may be obtained, if desired. Instead of the ball-and-socket joints 22 and 26, any other type of universal joint such as Hooke's joint, may be employed. One type of Hooke's joint, so employed, is hereinafter described. Instead of the pointer indicator 44 operated by gear and sector 42 and 40, electrical means such as compression of a carbon-pile rheostat or piezo crystal may be used to indicate or record the wind pressure or velocity through suitable deflecting or sliding pointers or indicators.

Fig. 13 shows the wire 38 connected to one arm of a bell-crank lever 160 having a fixed fulcrum 162. The other arm of lever 160 is slotted and is pivoted to a rod 164 which presses against and is insulated from a movable metal terminal plate 166 of a carbon-pile rheostat 168. A constant electric potential, either alternating or continuous, is supplied to conductors 172 and 174 so that an electric current traverses the circuit from conductor 172 to the fixed rheostat terminal plate 176, through carbon blocks 170 to plate 166, from thence to an ammeter 178 and finally to supply conductor 174. In response to tension on wire 38 the carbon blocks 170 are compressed, resulting in a lowering of their electric resistance, an increase of current in the circuit, and hence, an increase in the indication of ammeter 178. The ammeter 178 can be suitably calibrated to read directly in wind velocity or pressure.

Fig. 15 illustrates the use of the piezo-electric effect as an indicating means. Wire 38 is connected to one arm of a bell-crank lever 180, pivoted to a base 186, the other arm of said lever being provided with a pointed offset 182 arranged to exert pressure on a plate 184 slidably mounted on base 186 which is provided with a rear stop plate 188, parallel to plate 184. A plurality of piezo-electric crystals 190, such as tourmaline or quartz, are placed between plates 184 and 188, with their electric axes coinciding with the direction of force exerted between plates 184 and 188, upon an insulator 192 between said crystals and base 186. A metal separator 194 is placed between each pair of crystals 190 arranged so that their electromotive forces are paralleled. When wire 38 is tensed, the crystals 190 are compressed and an electric potential proportional to the pressure exerted appears between terminals 196 and 198. A resistance-coupled electronic amplifier 200 steps up the potential so that it can conveniently be read on a suitably calibrated ammeter 202.

Referring now to Fig. 2, I have shown the flexing member 14, of Fig. 1, replaced by a short rigid cylindrical member 60, attached to whose lower extremity is a wire or chain 62 which passes through a ring guide 64 secured within the tube 12 and is attached to the gear sector 40. The restoring spring 46, of Fig. 1, is here replaced by a very powerful helical spring 66.

Figs. 11 and 12 show a form of Hooke's joint used in place of the ball-and-socket joint of Fig. 2. The member 60 is prolonged to attach directly to the head 58 and is secured to and guided by a semicircular link 210, free to rotate about bearings 212 in an annular ring 214. The ring 214 is rotatably supported in fixed bearings 216 whose axes are at right angles to the axes of bearings 212. The resulting functional relation between the head 58 and wire 62 is the same as that of the construction illustrated in Fig. 2.

A flexure lock 70 consists of a short hollow cylinder of metal with one side cut away to form a U so that it can be readily slipped between the top of the tube 12, and the lower shoulder 72 of the head 58. A U-shaped flexible spring clasp 74, Fig. 3, is attached to the inner surface of the flexure lock 70, so that the curved portions coincide and at the midpoint of which they are secured together.

The modification of Fig. 2 operates similarly to the device shown in Fig. 1, the tension of the spring 66 replacing the resilience of the flexing member 14 to provide the restoring torque to keep the head 58 in neutral or zero position.

Referring now to Fig. 4, I have shown a modification of my wind pressure gauge, in which a plurality of helical springs 80, are attached at their lower ends to the inner wall of the tube 12 and are connected by wires or chains 82, passing over pulleys 84, to the rigid member 60 bearing at the lower end a condenser plate 86. Secured to the tube 12 by insulating supports 88, are a plurality of equispaced condenser plates 90, of such shape and so located that the electric capacity between the plate 86 and the plates 90 is increased when member 60 is deflected. Individual electric conductors 92 connect each condenser plate 90 to the measuring system. A shield 94 is attached to the head 58 to prevent access of rain, dirt, etc., to the flexing joint. In lieu of the metal of which this shield 94 is constructed, it may be optionally of leather or any other suitable material.

Figure 6:
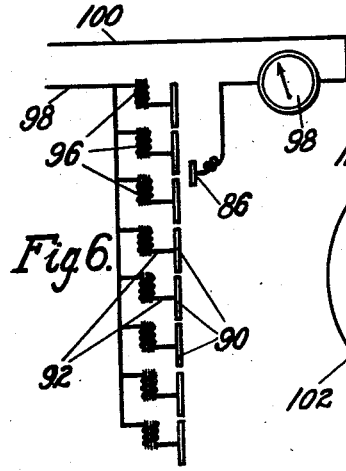
Figure 6 is a diagram of the electric circuit of the modification shown in Figs. 4 and 5.

Each conductor 92 of condenser plates 90 is connected to an electromagnet 96, Fig. 6, which electromagnets are connected to one conductor 98 of the single-phase alternating current supply circuit. The other supply conductor 100 is connected in series with an ammeter 98 to the condenser plate 86. The electromagnets 96 are grouped together in a casing 102, under an armature 104, carried on an arm 106 rotatable about a pivot 108, said arm being counterbalanced by suitable means (not shown) to permit easy rotation. Attached to and above the arm 106 is an annular gear sector 110 engaging a gear 112 which deflects a pointer 114. The gear 112 rotates on a shaft which also carries the pointer 114 and is journaled between said gear and pointer. The arm 106 is thus capable of free rotation about pivot 108 and under gear 112, and permits armature 104 to pass freely over electromagnets 96.

Figure 7:
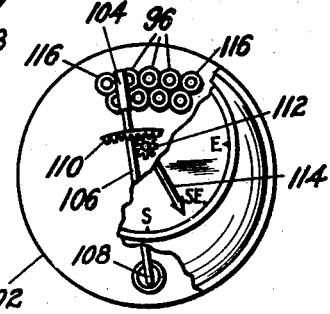
Figure 7 is a fragmentary view of the wind direction indicating device of the modification shown in Figs. 4, 5, and 6.

When wind movement causes deflection of condenser plate 86, an increased current is caused to flow through the ammeter 98 and into one or more condenser plates 90 and their corresponding electromagnets 96. The ammeter 98 can be conveniently calibrated to read directly in wind pressure or velocity. The soft iron armature 104 is attracted to the energized electromagnet and thus causes the pointer 114 to take the position corresponding to the wind direction. In case it is found desirable to obtain greater accuracy of the wind direction indicator, the construction illustrated in Fig. 14 may be employed. The end electromagnets 220 and 222 corresponding to electromagnets 116 of Fig. 7, are connected in series with condenser plate 224, with provision for short-circuiting electromagnet 220 by a relay 226 connected in series with condenser plate 228 and short-circuiting electromagnet 222 by a relay 230 connected in series with condenser plate 232. The impedances of the individual circuits in which the relay operating coils are connected are compensated for said coils so that the impedances of said circuits are identical with the remaining circuits, and the accuracy of indication on ammeter 98 is retained. When the movable condenser plate 86 is in such position that current flows through plates 224 and 228, as illustrated, relay 226 is closed, short-circuiting electromagnet 220. The armature 104, which, in the illustration of Fig. 6 might be equally attracted to either end-electromagnet and thus come to rest in an indeterminate position, will then take up a positive position at the proper end. In this manner an erroneous condition of balance of the armature is avoided. The gear 112 and sector 110 of Fig. 7 are so arranged that with the armature at either end of the group of electromagnets, the direction pointer 114 will take the same position.

Figure 8:
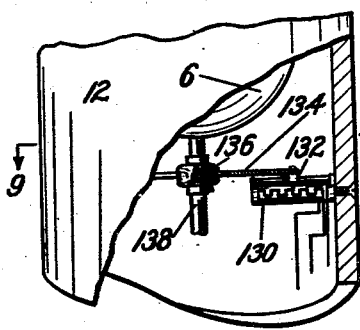
Figure 8 is a fragmentary sectional view of another modification of my wind pressure gauge.

Referring now to Fig. 8, I have shown four equispaced slide-wire resistors or rheostats 130, attached to the tube 12, each contacted by a sliding contact 132 attached respectively to an arm 134, pivoted to the contactor 132 at the outer end, and attached at the other end by a universal joint to the sleeve 136 on the member 138, which member may be operated similarly to either member 14 or 60.

Figure 10:
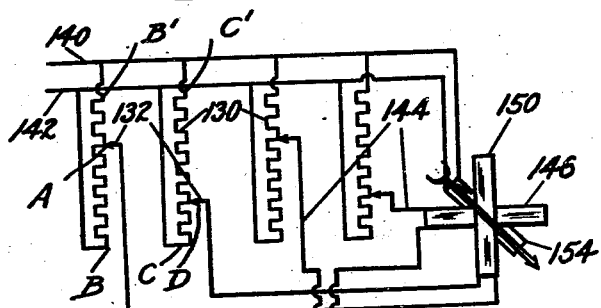
Figure 10 is a diagram of the electric circuit and indicating devices for the modification shown in Figs. 8 and 9.

The electric circuit of Fig. 10 employs either single-phase or direct current at the supply terminals 140 and 142, with the rheostats 130 arranged as potentiometers directly across the supply terminals. The opposing contactor conductors 144 are connected together in series with the fixed quadrature coil 146 of the direction indicator and with the dynamometer ammeter coils 148. The other opposing pair of contactors are similarly connected in series with fixed quadrature coil 150 of the direction indicator and dynamometer ammeter coils 152 of the velocity indicator. The moving coil 154 of the direction indicator is continuously energized from the supply source. The moving elements of dynamometers 148 and 152 are mechanically attached to the same shaft so their deflections are additive.

Figure 9:
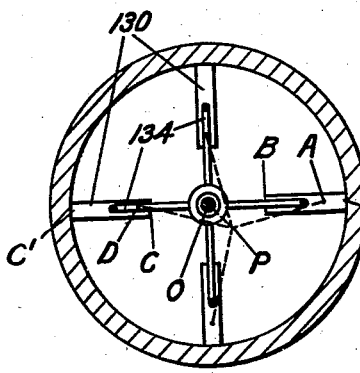
Figure 9 is a section taken on the line 9—9 of Fig. 8.
Figure 5:
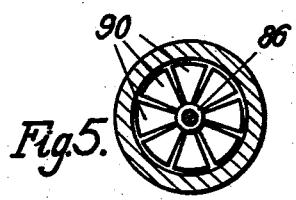
Figure 5 is a section taken on the line 5—5 of Fig. 4.

The operation of this device is as follows:

Deflection of element 138 causes movement of the contactors 132 along the potentiometer rheostats 130, for example, as in the dotted lines of Fig. 9. Referring now to Figs. 9 and 10, the potential difference between points A and B bears the same proportional relation to the voltage between supply conductors 140 and 142 as the distance AB to distance BB'. Similarly the voltage between C and D is to the voltage between conductors 140 and 142 as the distances CD to CC'. The potentials at points A and D are thus respectively AB/BB' and CD/CC'=CD/BB' of the potential difference between conductors 140 and 142, and the potential difference between points A and D is AB/BB' minus CD/BB' of the supply voltage and hence is proportional to the distance AB−CD along the rheostats.

From trigonometrical relations, $$BO + AB = OP \cos AOP + \sqrt{(AP)^2 - (OP \sin AOP)^2}$$

$$CD + CO = -OP \cos AOP + \sqrt{(DP)^2 - (OP \sin AOP)^2}$$

Subtracting and noting that BO=CO, and that AP=DP, $$AB - CD = 2OP \cos AOP$$

The voltage therefore is proportional to the actual deflection OP and to the cosine of the deflection angle with the circuit under consideration or first circuit.

Similarly in the quadrature circuit, the voltage is proportional to the deflection OP and to the sine of the deflection angle with the first circuit.

It can be readily seen therefore, that the direction indicator moving coil 154, together with its pointer, will take up a position corresponding to the direction of the deflection of the member 138 and thus also to the wind pressure.

In the case of the wind pressure indicator, the voltage, and therefore the current in the first circuit is proportional to 2OP cos AOP, and the current in the quadrature circuit is proportional to 2OP sin AOP, and since the dynamometer ammeters deflect according to the square of the current, this instrument will deflect proportionally to $$(2OP \cos AOP)^2 + (2OP \sin AOP)^2$$

which is equal to 4(OP)², or the indication of this instrument will be as the square of the deflection, and a suitable scale can be readily provided.

In a similar manner this principle can be shown to be operable for a system of three, four, five, or any number of symmetrically-spaced aligned pairs of rheostats. A direction indicator with a corresponding number of symmetrically-spaced fixed coils will indicate the true direction and a dynamometer-ammeter with a corresponding number of elements will indicate proportionally to the square of the deflection of the movable element. Furthermore, the principle is not limited to indicating only two-dimensional movements of the element as an equally simple analysis shows that the same means can be used to show the direction and a reading proportional to the square of the movement for three-dimensional movement of the movable element.

Although the invention has been described in considerable detail, such description is intended as illustrative rather than limiting as numerous embodiments will be apparent to those skilled in the art. My invention, therefore, is not to be limited except insofar as is necessitated by the prior art or by the spirit of the appended claims.

I claim:

1. In a system for the remote indicating of the movement of a body movable substantially in a plane, four slide-wire rheostats in space-quadrature about the field of movement of said body, rods pivotably connecting the sliders of said rheostats to said body, a source of electric current, a goniometer having two fixed coils in quadrature and a rotatable coil, and a two-element dynamometer ammeter, the rheostats being arranged in circuit with said source as potentiometers with the difference of potential between the sliders of each aligned pair of rheostats, respectively, forcing current through one fixed coil of the goniometer and one element of the dynamometer ammeter in series, respectively, the rotatable goniometer coil being separately energized from the electric source.

2. In a wind gauge, a fixed member, a movable member universally coupled to and capable of being axially aligned with said fixed member and being deflected from alignment by the wind, means for restoring said member to alignment, and remote deflection indicating means comprising a member coaxial with and integral to said movable member, four linear slide rheostats attached to said fixed member radially, concentrically, and in quadrature about the axis of said fixed member in a plane perpendicular thereto, rods pivotally connecting the sliders of said rheostats to said movable member, a source of electric current, a goniometer having two fixed coils in quadrature and a rotatable coil, and a two-element dynamometer ammeter, the rheostats being arranged in circuit with said source as potentiometers with the difference of potential between the sliders of each aligned pair of rheostats, respectively, forcing current through one fixed coil of the goniometer and one element of the dynamometer ammeter in series, respectively, the rotatable goniometer coil being separately energized from the electric source, so that the goniometer indicates the direction of movement of the movable element from its axial position and the ammeter deflects proportionally to the wind velocity.

3. In combination, an element movable with respect to a predetermined point, a plurality of pairs of variable voltage sources including controllers movable linearly in aligned pairs along paths intersecting symmetrically at said point, each of said controllers being linked to said element for movement in response to movement of said element so that the sum of the voltages of the two sources corresponding to each pair of aligned controllers is proportional to the translation of the element from said point, and a direction indicator cooperatively connected to said pairs of sources in a manner constructed and arranged to indicate the direction of movement of said element with respect to said point.

4. In combination, an element movable with respect to a predetermined point, a plurality of pairs of variable voltage sources including controllers movable linearly in aligned pairs along paths intersecting symmetrically at said point, each of said controllers being linked to said element for movement in response to movement of said element so that the sum of the voltages of the two sources corresponding to each pair of aligned controllers is proportional to the translation of the element from said point, and a dynamometer ammeter cooperatively connected to said sources in a manner constructed and arranged to indicate proportionally to the square of the movement of said element with respect to said point.

5. In combination, an element movable with respect to a predetermined point, a plurality of pairs of variable voltage sources including controllers movable linearly in aligned pairs along paths intersecting symmetrically at said point, each of said controllers being linked to said element for movement in response to movement of said element so that the sum of the voltages of the two sources corresponding to each pair of aligned controllers is proportional to the translation of the element from said point, a direction indicator cooperatively connected to said pairs of sources in a manner constructed and arranged to indicate the direction of movement of said element, and a dynamometer ammeter connected to said sources and so constructed and arranged to indicate proportionally to the square of the movement of said element with respect to said point.

6. A remote indicator comprising a movable element, a fixed system of four variable voltage sources including controllers movable linearly in aligned pairs along respectively perpendicular intersecting paths, each of said controllers being linked to said element for movement in response to movement of said element so that the sum of the voltages of the two sources corresponding to each pair of aligned controllers is proportional to the distance from said element to the point of intersection of said paths, a goniometer having two fixed coils in space quadature and connected respectively to one of said pairs of voltage sources and a separately energized coil mounted for rotation on the line of intersection of the fixed coils as an axis for indicating the direction of movement of said element, and means for indicating the magnitude of the distance between said element and said point comprising a two-element dynamometer ammeter whose coils are connected respectively to said pairs of voltage sources.

7. In combination, an element movable with respect to a predetermined point, a plurality of variable voltage sources including controllers movable linearly along paths intersecting symmetrically at said point, each of said controllers being linked to said element for movement in response to movement of said element so that the voltages of the sources are proportional to the translation of the element from said point, and means to indicate the direction of movement of said element with respect to said point.

8. In combination, an element movable with respect to a predetermined point, a plurality of variable voltage sources including controllers movable linearly along paths intersecting symmetrically at said point, each of said controllers being linked to said element for movement in response to movement of said element so that the voltages of the sources are proportional to the translation of the element from said point, and means to indicate the magnitude of translation of said element from said point.

9. In a system for remotely indicating the direction and magnitude of movement of a body, the combination of a plurality of variable rheostats having linearly movable elements arranged in aligned pairs each equidistant from an initial position of said body, means coupling each of said elements to said body, said elements being arranged to have their paths of movement spaced symmetrically about and intersect at the initial position of said body, to occupy similar positions on their respective rheostats when said body is in said initial position and to be moved along said paths by said body upon movement thereof from said initial position, a goniometer comprising a plurality of fixed coils corresponding in number to the number of pairs of said rheostats, having a common line of intersection and being inclined to each other in corresponding space distribution to said paths of movement, said goniometer also including a movable coil mounted for rotation on said line of intersection as an axis, a dynamometer ammeter, and a source of electric current for energizing said goniometer and said ammeter, said rheostats being so arranged as potentiometers in circuit with said goniometer and said ammeter that the differences of potential on the respective pairs of rheostats corresponding to the positions assumed by said aligned pairs of movable elements in response to movement of said body force current through the corresponding fixed goniometer coils and said ammeter.

FRANK KAHN.